United States Patent
Weindler et al.

[15] 3,636,785
[45] Jan. 25, 1972

[54] V-BELT PULLEY

[72] Inventors: Berno Weindler, Wiesloch, Baden; Robert Ruprecht, Aichelberg Kreis Esslingen am Neckar; Heinrich Grimm, Raidwangen Kreis Nurtingen, all of Germany

[73] Assignee: Ernst Heinkel Aktiengesellschaft, Stuttgart-Zuffenhausen, Germany

[22] Filed: Nov. 26, 1969

[21] Appl. No.: 880,235

[30] Foreign Application Priority Data

Nov. 30, 1968  Germany .................. P 18 11 935.2

[52] U.S. Cl. ................................................. 74/230.17
[51] Int. Cl. ............................................. F16h 55/52
[58] Field of Search ................................. 74/230.17

[56] References Cited

UNITED STATES PATENTS

| 2,952,161 | 9/1960 | Williams | 74/230.17 C |
|---|---|---|---|
| 3,174,348 | 3/1965 | Luenberger | 74/230.17 C |
| 3,358,520 | 12/1967 | Heydlauf et al. | 74/230.17 C |
| 3,400,600 | 9/1968 | Ruprecht et al. | 74/230.17 C |
| 3,434,641 | 3/1969 | Ambros | 74/230.17 C |
| 3,504,560 | 4/1970 | Wunsch | 74/230.17 C |

*Primary Examiner*—C. J. Husar
*Attorney*—Michael S. Striker

[57] ABSTRACT

A pair of belt transmission flanges are mounted on a rotatable shaft with at least one of the flanges biassed in direction toward and axially movable to and from the other flange so as to adjust the width of the belt gap defined between the two flanges. The at least one movable flange comprises a hub, the inner peripheral surface of which spacedly surrounds the outer cylindrical surface of the rotatable shaft with a pair of bearing members axially spaced between and in contact with these surfaces. A torque transmitting member interconnects the at least one movable flange with the rotatable shaft so as to effect rotation of the former with the latter.

22 Claims, 3 Drawing Figures

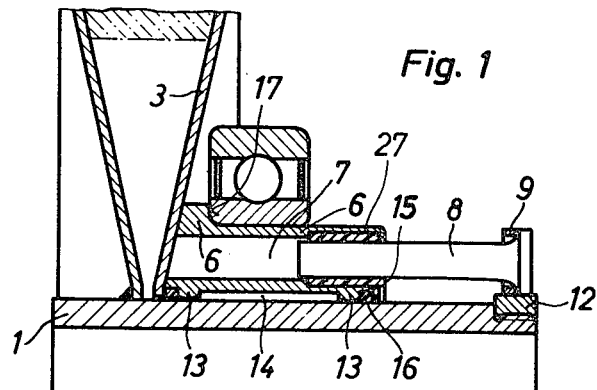
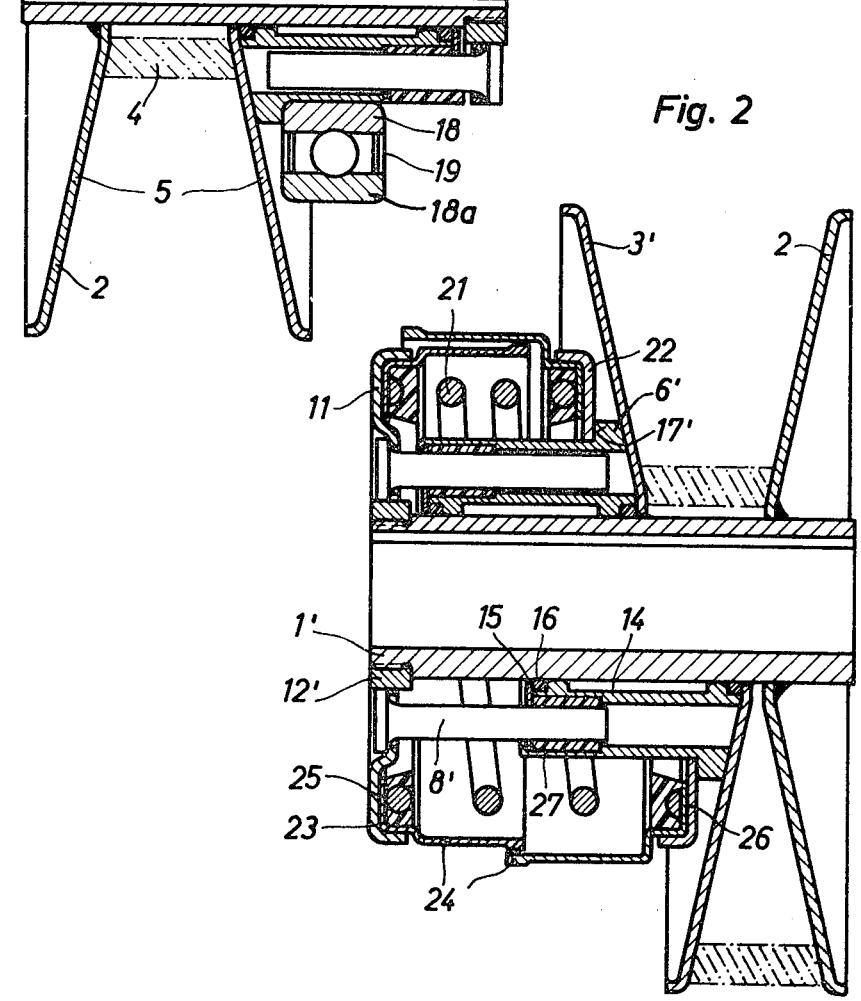

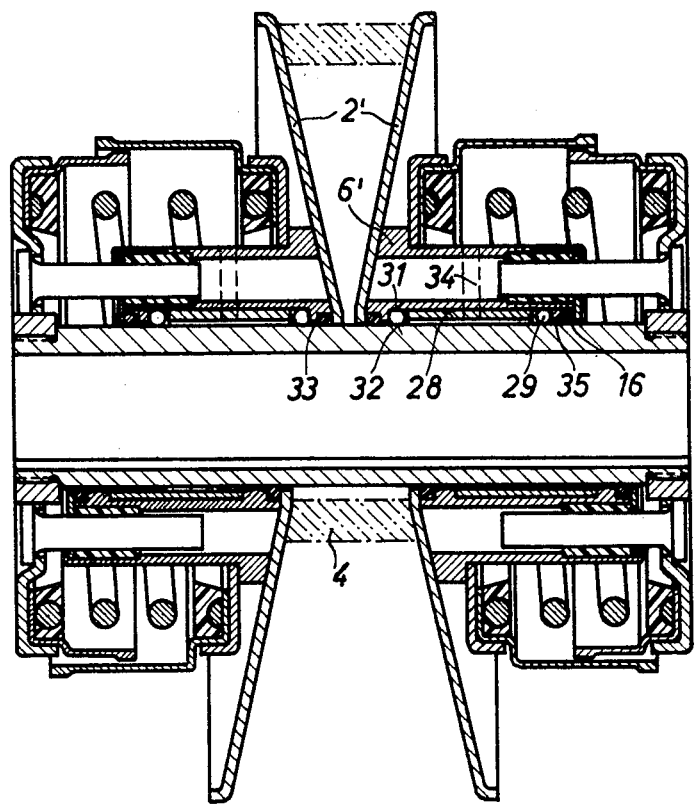

3,636,785

V-BELT PULLEY

BACKGROUND OF THE INVENTION

The present invention relates in general to an adjustable V-belt pulley and more in particular to improvements in mounting the axially reciprocable flange or flanges on rotatable shafts or guide rods of the pulley of a continuously variable drive arrangement.

Such drive arrangements are known and utilize adjustable feed belts which pass around a pulley coupled to a shaft from which or to which power is to be transmitted. In order to permit continuous power variation, it is necessary that such pulleys be adjustable, and they therefore usually comprise two flanges mounted on a series of guide rods which extend parallel with the drive shaft and with at least one of the flanges axially movable relative to the other flange which, likewise, may be movable or fixed. Between themselves, the inclined opposed surfaces of the two flanges define a V-shaped groove in which the feed belt is received. To achieve continuous variation of the drive arrangement, the movable flange shifts axially away from the fixed flange, or in case of two movable flanges, away from each other, to a greater or lesser degree and the feed belt is supported at a greater or smaller distance from the shaft by engagement with the opposed surfaces of the two flanges. In addition, the movable flange or flanges must be able to perform only axial movements and must be secured against rotation relative to the shaft member.

Axial shifting of the movable flange or flanges not only serves to vary the transmission of power by varying the tension of the feed belt but also to equalize the variation in width of the belt. Such variations are to be found even in new belts.

In such hitherto known variable drive arrangements, the respective flanges usually are a casting from aluminum or gray cast iron, and the movable flange or flanges are provided with an elongated hub member in which a bushing or sleeve is accommodated. This bushing or sleeve comprises annular recesses along its inner periphery and in which annuli of roller bearings were seated for axial rolling movement of the movable flange on the guide rods.

Outside of the region of the bushing, the hub member is provided with a plurality of end bores in which guide bolts are slidably received and which guide bolts slidably interconnect the movable flange member with the rotatable shaft in order to transmit the torque of the latter to the former.

Such movable flanges either are self-adjustable by means of a spring member annularly surrounding the hub member and biassed between abutment members on the movable flange and on the shaft, or are mechanically adjustable, for example, by means of roller bearing elements which, comprises an inner race fixedly connected to a shoulder on the movable flange and an outer race movable relative to the inner race and subjected to exterior pressure to axially move the movable flange towards the other flange.

Such variable drive arrangement, however, are uneconomical and expensive as regards their construction and maintenance.

For example, the elongated extended hub member of the movable flange necessitates voluminous space for reasons that the same has to accommodate the guide rods in their respective dead end bores, the roller bearing arrangement or the spring member to axially bias the movable flange, and the roller bearing and sleeve arrangement to axially shift the movable flange in response to said biassing of the same.

In addition, the recesses formed in the sleeve to accommodate the roller bearings have to be extremely precise and overall symmetric so as to avoid obliquity and tilting of the movable flange and, thereby, consequent malfunctioning of the feed belt which would negatively affect the durability of the same.

SUMMARY OF THE INVENTION

Object of the present invention is to provide a variable drive arrangement incorporating a V-belt pulley which is simple as regards its construction, economical as regards its manufacture, and which provides an improvement in mounting the axially reciprocable parts or analogous structure on the rotatable shafts or guide rods.

Such a variable drive arrangement with a V-belt pulley according to the present invention comprises a rotatable shaft member having an outer cylindrical surface with a first and a second flange member mounted on the shaft member with at least one of the flange members axially movable relative to the other of said members. A hub member is fixedly connected with the at least one movable flange member and comprises an inner peripheral surface spacedly surrounding the outer cylindrical surface of the shaft member. First and second bearing means spaced in axial direction of the shaft member are accommodated between and in contact with the said surfaces and biassing means constantly bias the at least one movable flange member in direction toward the other of the said flange members. The biassing means is constantly positioned into contact with the at least one movable flange member and the torque of the shaft member is transmitted to the at least one movable flange member by means of a member interconnecting the former and the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a cross-sectional view of a mechanically adjustable V-belt pulley according to the present invention and illustrating an upper portion of the pulley in which the movable flange has been axially moved toward the fixed flange, and a lower portion of the pulley in which the movable flange has been axially moved away from the fixed flange;

FIG. 2 shows an arrangement as in FIG. 1, however, with the respective axially shifted movable flanges self-adjustable by a spring member; and FIG. 3 shows a further embodiment of a self-adjustable V-belt pulley incorporating two axially movably mounted flanges with the upper flanges in a more compressed condition and the lower flanges in a substantially spread condition.

DESCRIPTION OF THE PREFERRED EMBODIMENTS

Referring now to the drawings, FIGS. 1 illustrates an adjustable V-belt pulley which comprises a rotatable shaft 1 having an outer cylindrical surface, a flange 2 fixed at one end of the shaft 1 and welded thereto, and a flange 3 axially movably mounted on the shaft 1 and having an inner peripheral surface spacedly surrounding the outer cylindrical surface of the shaft. The respective flanges are pressed from sheet metal and, between themselves, the inner inclined and opposed flange surfaces 5 define a V-shaped groove in which a feed belt 4 is adjustably received.

Laterally fixed to the movable flange 3 by soldering, is an annular sleeve or hub member 6 which comprises a plurality of bores 7 each of which slidably accommodates one of a plurality of guide rods 8 which at their outer end are fixed and soldered to an annular disc-shaped rod support 9 which, preferably by soldering, are fixedly connected to a threaded ring member 12. The ring member 12 is screwed onto the free end of the shaft 1 and secured against loosening therefrom by means of a filling or adhesive material.

The sleeve 6 essentially consists of a hardenable steel and comprises in the regions of its axially spaced ends two bearing projections 13 unitary with the inner peripheral surface of the sleeve 6 and engaging of the outer cylindrical surface of the shaft 1 for axially slidable movement thereon. The sliding surfaces of the bearing projections 13 are arcuately shaped and hardened, and are fine cut relative to the diameter of the outer cylindrical surface of the shaft 1 and a clearance or sliding tolerance such that the movable flange 3 onto which the torque of the shaft 1 is to be transmitted by the guide rods 8, is easily axially shiftable along the outer cylindrical surface of the shaft 1. As a result of the positioning of the slidable bearing members at the axially opposite ends of the sleeve 6, the relationship between the length of the sleeve and the diameter of the movable flange becomes more favorable as regards the tilting angle of the latter. In addition, the space defined between the two bearing projections 13, on the one hand, and the inner peripheral surface of the sleeve 6 and the outer cylindrical surface of the shaft 1, on the other hand, constitutes a relatively large compartment 14 which, filled with a lubricant, ensures a suitable lubrication for the moving parts for the entire duration of the drive arrangement.

Flanking the bearing projections 13 at axially opposite ends of the sleeve 6 and accommodated in the annular recesses formed at these ends, are a pair of O-rings 16 which serve to seal the compartment 14. At their outer ends, the O-rings are enclosed, at the one hand, by the flange 3 and, at the other hand, by a seal ring 15.

The sleeve 6 is formed with an annular shoulder 17 which, in the embodiment shown in FIG. 1, is provided with the inner race 18 of an annular roller bearing arrangement 19. The inner race 18 is fixedly pressed onto the shoulder 17 while the outer race 18a of the arrangement 19 is rotatable and operatively engaged by a mechanical biassing member, not shown, which serves to bias or press the movable flange 3 in direction toward the fixed flange 2.

With the present embodiment of the drive arrangement according to the invention and which incorporates a relative compact sleeve or hub having a corresponding outer diameter, it is made possible to utilize roller bearings which, when used with identically dimensioned flanges, can be twice as small as the roller bearings hitherto used for this purpose which, all around, is quite economical.

The embodiment of the variable drive arrangement shown in FIG. 2, is self-adjustable, i.e., instead of the mechanically actuated roller bearing arrangement 19 of FIG. 1, a spring member 21 is provided to bias the movable flange 3' in direction toward the fixed flange 2.

The spring member 21, at the one hand, abuts against and is supported by a bracket or flange 11 which is soldered to the guide rods 8' and the threaded ring 12' screwed onto the free end of the shaft 1' and, on the other hand, abuts against and is supported by a flange ring 22 which, in turn, abuts against an annular shoulder 17' of the sleeve 6'.

The end portions or windings of the spring member 21, preferably, are provided with plastic rings 23 and which are embodied such as to effect centering the balancing of the spring member 21.

In order to prevent the admittance of dirt and dust into the spring region and consequent malfunctioning of the spring member, the latter is enclosed in telescopically overlapping plastic caps 24 which are accommodated in convexities in the bracket 11 and the flange ring 22, respectively, and are retained in the same under the spring force of the spring member 21.

The embodiment shown in FIG. 3 is seen to be self-adjustable and to incorporate two axially movable flanges instead of one.

This arrangement is embodied such that the movable flanges 2' always retain the feed belt 4 centrally of the drive arrangement, i.e., midway of the rotatable shaft, with the belt either in its highest or lowest position between the flanges 2'.

The operation of the respective movable flanges 2' and their general arrangement on the rotatable shaft is analogous with that of the movable flange 3' of FIG. 2, however, with the exception that the upper portion of the drive arrangement is seen to comprise annular recesses 28 in the sleeve 6' and in which a pair of annular roller bearing elements 29 are accommodated. These elements 29 are in rolling contact both with the inner peripheral surface of the sleeve 6' and the outer cylindrical surface of the rotatable shaft and permit the movable flanges 2' to be axially shifted under the bias of the spring member.

The bearing surfaces 31 are hardened. Such hardening of the bearing surfaces may be effected, for example, by coating the same with a layer of hard chromium.

Flanking the roller bearing elements 29 at their outer ends and outer races 33 integrally formed with the sleeve 6' and having an inner peripheral diameter which is larger than the diameter of the outer cylindrical surface of the shaft so as to not abut against or engage the same.

Provided intermediate the two roller bearing elements 29 is a spacer member which is held by a dowel pin 34 and serves to keep the space slotted for each of the roller bearing elements, constant. Axially inserted into the recess formed between the inner periphery of the outer races 35 and the outer cylindrical surface of the shaft, is a butting and sealing ring 35 and, as in the embodiments of FIGS. 1 and 2, accommodated in the recesses at the free ends of the sleeve 6' is an O-ring 16.

In the embodiments shown in FIGS. 1, 2 and 3, each of the dead-end bores 7 arranged in the sleeves to guide the slidable guide rods 8, 8', is provided at their open ends with a sliding sleeve 27 which are made of a plastic material and have spaced ends with a slanting slit extending from one end to the other.

This slit permits a much closer restraint on the tolerance between the guide rods and the sliding sleeves since the strength of the plastic sliding sleeves can much easier be kept within close tolerance limits than their respective outer or inner diameter, especially since during insertion of the sliding sleeves into the dead-end bores or during insertion of the guide rods into the sliding sleeves and with but a slight variation in either the tolerance of the outer diameter of the guide rods or the inner diameter of the dead-end bores, these outer or inner diameters of the sliding sleeve can change so extensively relative to each other that the guide rods 8 can easily be jammed in the guide sleeves.

The plastic sliding sleeves are axially secured in the dead-end bores by means of the sealing ring 15 which, by means of an inwardly flanged side portion of the sleeve 6, are retained in the same. In conventional embodiments such sealing rings usually are retained or connected by at least three screw members, however, such a connection is of course uneconomical and in addition, and in view of the relatively small diameters of the sealing rings 15 and the ring-shaped guide rod carriers 9, the roller bearing arrangements 19 may easily be stripped from the sleeves 6, 6', without the hitherto required initial removal of other components.

It will be appreciated that the respective bearing elements, i.e., the sliding projections 13 and the roller bearings 29, may be positioned either on the inner peripheral surface of the sleeves, as described hereinbefore, or on the outer cylindrical surface of the rotatable shafts, depending on the nature of the application of the drive arrangement.

Consequently, the scope of the subject application is not to be limited to the above arrangement as described with reference to the various embodiments shown in the attached drawings.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sheave, a combination comprising a rotatable shaft member having an outer cylindrical surface; a first and a second sheet metal flange member mounted on said shaft member, at least one of said flange members being axially movable relative to the other; a hub member fixedly connected to said at least one movable sheet metal flange member and having an inner peripheral surface spacedly surrounding said outer cylindrical surface of said shaft member; first and second bearing means spaced in axial direction of said shaft member between and in contact with said surfaces; means on said hub member for transmitting a biasing force to said hub member and the flange member connected thereto for biasing said at least one movable flange member towards the other flange member; and means for transmitting a torque between said shaft member and said at least one movable flange member.

2. In a sheave as defined in claim 1, wherein said means for transmitting a biasing force to said hub member comprises a roller bearing having an inner race surrounding and fixed to said hub member and an outer race rotatably surrounding said inner race and engageable by a biasing force.

3. In a sheave as defined in claim 1, and including biasing means in form of a spring member surrounding said hub member and having opposite ends, one of said ends being connected to said one movable flange member and retaining means positioned on said shaft member and retainably engaging the other of said ends of said spring member.

4. In a sheave as defined in claim 1, wherein said at least one movable flange member has axially opposite ends with one of said opposite ends facing said other of said flange members and with said hub member fixed to the other of said opposite ends.

5. In a sheave as defined in claim 1, wherein said first and second bearing means each comprises an annulus of rolling elements accommodated and retained in a circumferential recess formed in one of said surfaces.

6. In a sheave as defined in claim 5, wherein said circumferential recesses are formed in said inner peripheral surface of said hub member.

7. In a sheave as defined in claim 5, wherein said rolling elements include bearing surfaces in rolling contact with said surfaces of said hub member and said shaft member, and wherein said rolling elements at least in the region of said bearing surfaces consist of a hardened material.

8. In a sheave as defined in claim 1, wherein said first and second bearing means each comprises a circumferential projection unitary with one of said surfaces and having a peripheral surface in sliding contact with the other of said surfaces.

9. In a sheave as defined in claim 8, wherein said circumferential projections are unitary with said inner peripheral surface of said hub member and external radially inwardly therefrom.

10. In a sheave as defined in claim 8, wherein the sliding surfaces of said circumferential projections are arcuately shaped.

11. In a sheave as defined in claim 8, wherein said sliding surfaces are hardened and define an internal opening having a diameter which exceeds that of said shaft member by a predetermined tolerance.

12. In a sheave as defined in claim 4, wherein said other of said flange members is a stationary member unitary with said shaft member, and wherein said hub member is unitary with said one movable flange member.

13. In a sheave as defined in claim 12, wherein said stationary flange member and said shaft member, at the one hand, and said one movable flange member and said hub member, at the other hand, are bonded to each other.

14. In sheave as defined in claim 3, and further comprising a shoulder portion in said hub member, said shoulder portion constantly engaging said one of said ends of said spring member.

15. In a sheave as defined in claim 3, wherein said retaining means comprises a bracket member fixedly secured at one end of said shaft member and facing said one movable flange member.

16. In a sheave as defined in claim 3, wherein said retaining means comprises a flange member fixedly secured at one end of said shaft member and facing said one movable flange member.

17. In a sheave as defined in claim 14, and further comprising a flange member seated against said shoulder portion intermediate the same and said one of said ends of said spring member.

18. In a sheave as defined in claim 1. Wherein said hub member comprises at least one axially extending bore; and wherein said torque transmitting means comprises at least one elongated rod member having opposite ends with one of said opposite ends slidably received in said at least one bore in said hub member, and a retaining ring fixedly mounted on said shaft member axially spaced from said hub member and fixed with the other of said opposite ends of said rod member.

19. In a sheave as defined in claim 18, said hub member comprising a first portion facing said one movable flange member and a second portion facing said retaining ring, said means for transmitting a biassing force to said hub member comprising a roller bearing having an inner race surrounding and fixed to said second portion of said hub member and an outer race rotatably surrounding said inner race, and wherein said second portion of said hub member and said retaining ring have respectively outer diameters not exceeding the inner diameter of said inner race.

20. In a sheave as defined in claim 19, wherein said at least one bore in said hub member is provided with an inner sleeve member slidably guiding said at least one rod member.

21. In a sheave as defined in claim 20, wherein said inner sleeve member is made of a plastic material having a low coefficient of friction, said sleeve having spaced ends and being provided with a slit extending from one to the other of said spaced ends.

22. In a sheave as defined in claim 1, wherein said other of said flange members is a reciprocable flange member axially movable relative to said one of said movable flange members.

* * * * *